April 30, 1957 H. E. J. NEUGEBAUER 2,790,844

COLOR CORRECTION SELECTOR

Filed May 11, 1954 5 Sheets-Sheet 1

Inventor
Hans Edwin Julius Neugebauer

By Bailey, Stephens and Huettig
Attorneys

Inventor
Hans Edwin Julius Neugebauer
By Bailey, Stephens and Huettig
Attorneys

Inventor
Hans Edwin Julius Neugebauer
By Bailey, Stephens and Huettig
Attorneys

Inventor
Hans Edwin Julius Neugebauer

By Bailey, Stephens and Huettig
Attorneys

Inventor
Hans Edwin Julius Neugebauer
By Bailey, Stephens and Huettig
Attorneys

United States Patent Office 2,790,844

Patented Apr. 30, 1957

2,790,844

COLOR CORRECTION SELECTOR

Hans E. J. Neugebauer, Montreal, Quebec, Canada, assignor to Adalia Limited, Montreal, Quebec, Canada, a corporation of Canada Application May 11, 1954, Serial No. 429,053

15 Claims. (Cl. 178—5.2)

This invention relates to an improvement in methods and apparatus for making printed reproductions of colored pictures and more particularly to a method and apparatus which enables color corrections for the reproductions to be selected.

The general principle of the electronic scanning machines which have previously been developed to enable color reproductions to be made by impression printing is as follows. A multicolor original is scanned by a multiple scanning device which yields three electric signals which are functions of the color coordinates of the color of the original picture at the point being scanned. These electric signals will be called tristimulus signals. The tristimulus signals are fed to a computing apparatus which produces signals which control devices for recording corrected color separations. These corrected color separations are used to make printing plates. When suitable inks are superimposed by means of these printing plates a reproduction of the original is obtained. A device of the type described above will be referred to as a "scanning machine" in this specification and should be distinguished from the new apparatus described in this specification which also comprises a scanning device. Although many different types of scanning machines have previously been developed and used, none has proven to be entirely satisfactory. One reason for this is that they lack the flexibility to enable satisfactory reproductions to be made where the corrections which should be made are not completely straight forward. Thus in many cases a faithful reproduction is not desirable for artistic or other reasons. If the original is a picture painted by an artist or a color transparency the gamut of the reproduction method often is not great enough for a faithful reproduction. The brightness and/or color range of the original will be compressed in the printed picture which then may be called a "faithful reproduction within the gamut of the reproduction method." Even if the computor of the scanning machine is adjusted to compress the color gamut the result may be unsatisfactory as different methods of compression may be best suited for different pictures even if the originals are all of the same type, for example transparencies on the same type of photographic material. The consequence is that it may often be necessary to make a series of trial prints with adjustments to the computing apparatus or its input or output signals, made solely on the basis of the skill and experience of the operator until an acceptable reproduction is finally obtained.

In my copending application Serial No. 425,567 filed April 26, 1954, a method and apparatus was described for making corrections to localized areas of a picture different from the overall corrections. Even where these localized corrections can be made it may be necessary to use trial and error to obtain a satisfactory reproduction. The object of this invention is to provide a method and apparatus which will enable an operator to judge the effect of color corrections while he is making these color corrections. The operator can therefore effect deliberate color changes to part or all of the picture or compensate for the limited color gamut of the reproduction method without waiting for prints to be made before he can appreciate the effect of each correction. This decreases the time wasted even by a highly skilled operator in making trial prints and also enables satisfactory results to be achieved by a less skilled operator.

In accordance with this invention means are included in a scanning machine to provide a projected image of the original simulating the printed picture as it will finally appear after the scanning machine has been used to make printing plates and these in turn have been used to make a printed reproduction. Means are also provided to adjust the relationship between the color stimuli of the original and the colorants printed by the reproduction process. The adjusting means is arranged so that the corrections represented by the adjustments can be applied to the projected image before they are included in making the final printed reproduction.

Considering first the case of a reflective copy the colours of which lie within the gamut of the printing process, the projected image produced by the color correction selector will be a faithful reproduction of the original. As will be explained below, the image should be viewed under substantially the same conditions of viewing as those of the finally printed picture. If the operator wishes to make overall or localized color changes to the image, he can make an adjustment which will effect these changes in the image. When the corrections thus made to the image are satisfactory, these corrections are applied as adjustments to the scanning machine for making the printing plates.

If an original is used which cannot be reproduced faithfully the image produced by the color correction selector is a faithful replica of the printed picture as it would be obtained with the ordinary setting of the scanning machine. If this image seems satisfactory the original can be used for making color separations with the ordinary setting of the scanning machine. If the image is unsatisfactory, the operator can arbitrarily change its colors uniformly for the whole of the picture and/or in certain sections until it is satisfactory. Printing plates are then made using the scanning machine with the inclusion of these arbitrary changes.

Before the design of color correction selectors in accordance with the preferred embodiment of this invention is considered in detail their theoretical fundament will be considered.

The three light sensitive elements of the scanning device have spectral response curves which are equal to a set of color mixture curves so that the three signals, $b_o$, $g_o$, $r_o$, generated by the scanning device are either the tristimulus values X, Y, Z of the colors of the original or they are a linear transform of X, Y, Z with non-vanishing determinant. The subscripts "$o$" are added to the symbols $b$, $g$, $r$ to indicate that they characterize the colors of the original.

The best way of producing the image for the color correction selector is by way of additive mixture. For example the screens of three C.-R. tubes are projected on the same surface by means of three lenses equipped with a blue, a green, and a red filter respectively. It is known that the intensities $b_i$, $g_i$, $r_i$, radiated by three corresponding points of the screens of these three C.-R. tubes must be linearly related to $b_o$, $g_o$, $r_o$ in order that the image point may have the same color as the corresponding point of the original represented by $b_o$, $g_o$, $r_o$. To ensure that the image is a faithful reproduction of the original equations $$b_i=K_{bb}b_o+K_{bg}g_o+K_{br}r_o$$
$$g_i=K_{gb}b_o+K_{gg}g_o+K_{gr}r_o$$
$$r_i=K_{rb}b_o+K_{rg}g_o+K_{rr}r_o$$

have to be satisfied where $K_{bb}$, $K_{bg}$ . . . are positive or negative constants. These equations have been frequently published, for instance by Hardy & Wurzburg, Journal of the Optical Society of America, 27, 227/240 (1937), where also the meaning of the constants is explained.

Usually a faithful reproduction of the original is not possible. Any color $b_o$, $g_o$, $r_o$ of the original is reproduced by a printed color $b_p$, $g_p$, $r_p$. (The subscripts "*p*" and "*i*" refer to "print" and "image" respectively.) The relations $$b_p=F_p(b_o, g_o, r_o)$$
$$g_p=F_g(b_o, g_o, r_o)$$
$$r_p=F_r(b_o, g_o, r_o)$$

depend on the printing process, the inks used, and the type of the original. One way of determining the functions $F_b$, $F_g$, $F_r$, may be explained for the case of reproductions printed by one specific printing process with one specific set of inks where the originals are positive multicolor transparencies made with one special type of photographic material. One selects a number of transparencies representing various objects and uses reproductions made by means of the specific printing process and considered satisfactory. Then, the color coordinates $b_p$, $g_p$, $r_p$, of as many points as possible are measured for the prints and for the corresponding points on the originals, the latter coordinates being $b_o$, $g_o$, $p_o$. The functions $F_b$, $F_g$, $F_r$, can be found by interpolation between a great number of empirically determined pairs of corresponding triplets $b_p$, $g_p$, $r_p$, and $b_o$, $g_o$, $r_o$.

Since the image is intended to be a faithful replica not of the original but of the printed picture, the linear equations cited above and relating $b_i$, $g_i$, $r_i$, to $b_o$, $g_o$, $r_o$, must be replaced by $$b_i=K_{bb}b_p+K_{bg}g_p+K_{br}r_p$$
$$g_i=K_{gb}b_p+K_{gg}g_p+K_{gr}r_p$$
$$r_i=K_{rb}b_p+K_{rg}g_r+K_{rr}r_p$$

The color correction selector is designed to carry out the following steps: The scanning device yields signals $b_o$, $f_o$, $r_o$ fed into a computer which puts out signals $b_p$, $g_p$, $r_p$. For this purpose the computer can be adjusted according to the special type of functions $F_b$, $F_g$, $F_r$ whose significance has been explained before. If a computer of the memory type, explained in applicant's copending application 420,834 filed April 1, 1954, is used it is easy to exchange memory screens simulating $F_b$, $F_g$, $F_r$, when the type of original or the printing process is altered. Signals $b_p$, $g_p$, $r_p$, are fed into three computers each of which yields one of the signals $b_i$, $g_i$, $r_i$, by calculating one of the linear equations mentioned above and relating $b_i$, $g_i$, $r_i$, to $b_p$, $g_p$, $r_p$. Signals $b_i$, $g_i$, $r_i$, are used to control the intensities of the three C.-R. tubes used to produce the image by additive mixture.

The color correction selector is designed, as will be explained below, so that the operator can deliberately alter the signals $b_i$, $g_i$, $r_i$ either uniformly for the whole picture or only for certain areas. Then, the input signals to the first computer are not $b_o$, $g_o$, $r_o$ but $b$, $g$, $r$ where $b$, $g$, $r$ are arbitrarily determined functions of $b_o$, $g_o$, $r_o$.

Usually such simple relations as $$b=Bb_o,\ g=Gg_o,\ r=Rr_o$$

yield sufficient possibilities of correction as the numerical constants B, G, R can have different values for different sections of the picture.

One additional remark has to be made with respect to the functions $F_b$, $F_g$, $F_r$. They are of such a type that $b_p$, $g_p$, $r_p$ never can be the color coordinates of a color that cannot be printed. To explain the meaning of such a restriction the simplest case may be considered where a reflection copy is to be reproduced the colors of which are assumed to be within the gamut of the printing process. In this case, $F_b$, $G_g$, $F_r$ are replaced by the simple equations $b_p=b_o$, $g_p=g_o$, $r_p=r_o$ as long as $b_o$, $g_o$, $r_o$ represent colors that can be printed. If, however, $b_o$, $g_o$, $r_o$ assume values representing a color that cannot be printed the first computer yields signals $b_p$, $g_p$, $r_p$ which are different from $b_o$, $g_o$, $r_o$ respectively and represent, of all the colors that can be printed, the one which comes closest to the color $b_o$, $g_o$, $r_o$.

As a consequence of the fact mentioned above that $b_p$, $g_p$, $r_p$ cannot be the color coordinates of a color which cannot be printed, the operator need not check the original to see whether it contains colors which cannot be printed and similarly there is no problem of colors which cannot be printed being selected by deliberate color changes. The image of the color correction selector will under no circumstances contain any color that cannot be printed.

In the drawings which illustrate the preferred embodiments of this invention:

Figure 2:
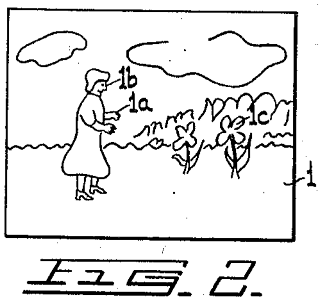
Figure 2 shows an original picture to be reproduced.
Figure 2A:
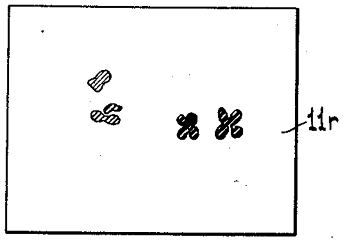

Figure 2*a* shows one of the correction sheets 11.

Figure 2B:
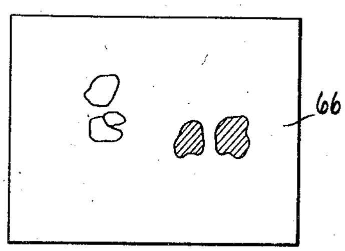

Figure 2*b* shows mask 66.

Figure 3:
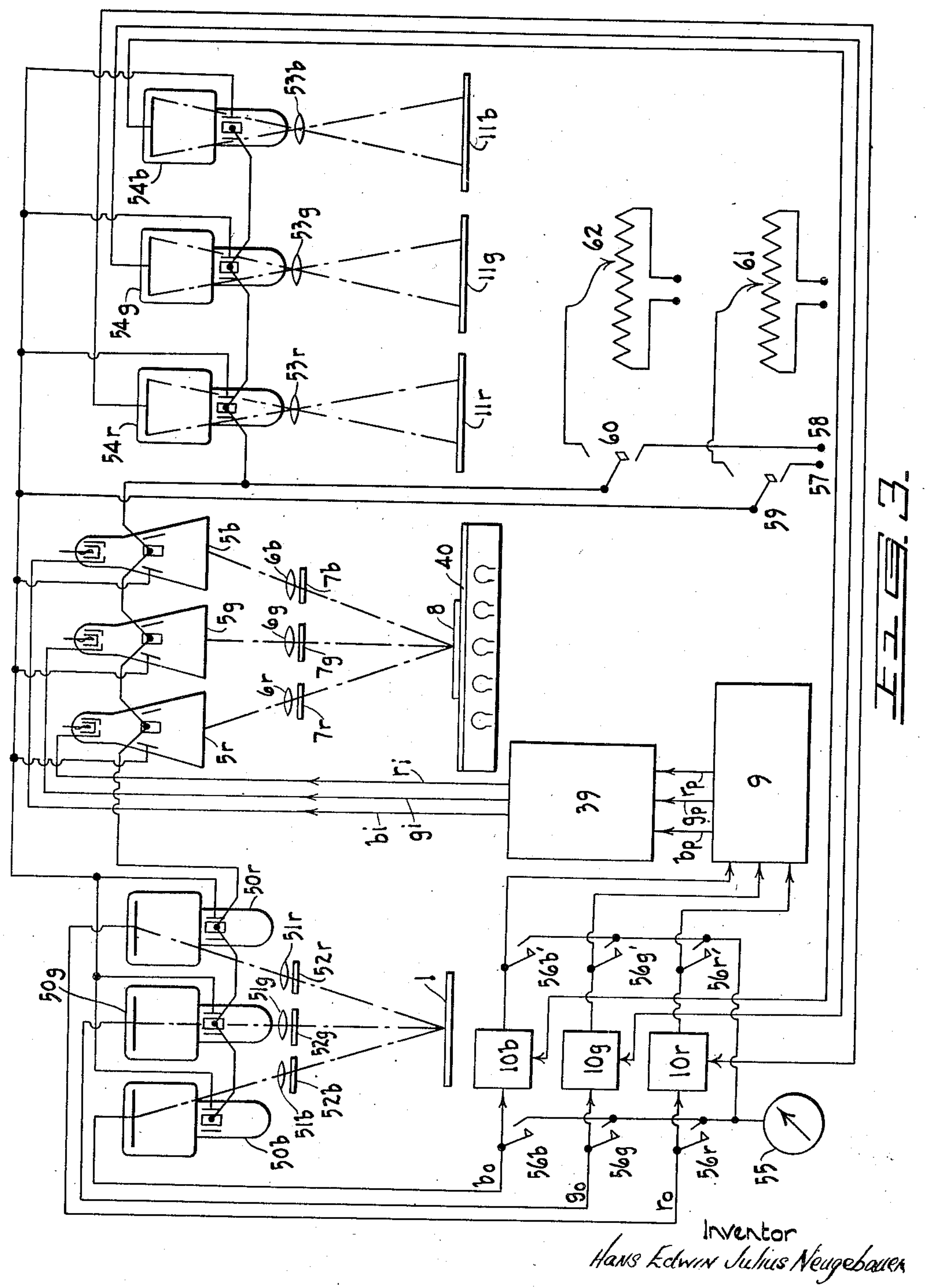

Figure 3 shows a color correction selector in accordance with another embodiment of this invention.

Figure 4:
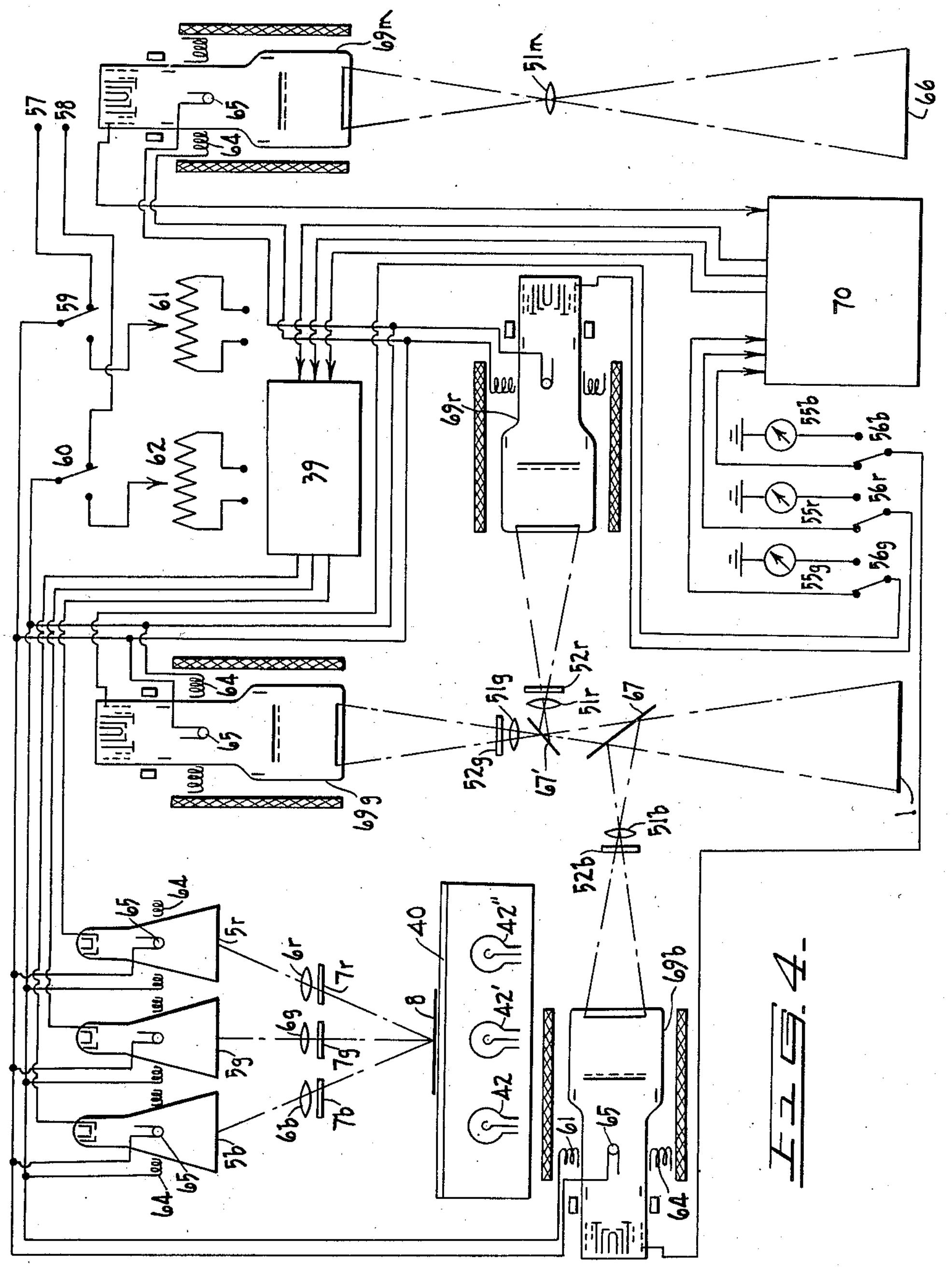

Figure 4 shows another color correction selector.

Figure 5:
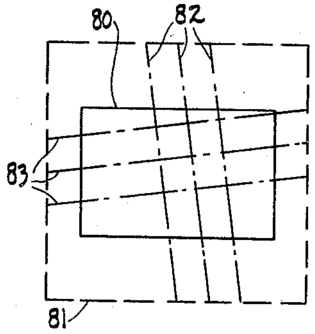
Figure 6:
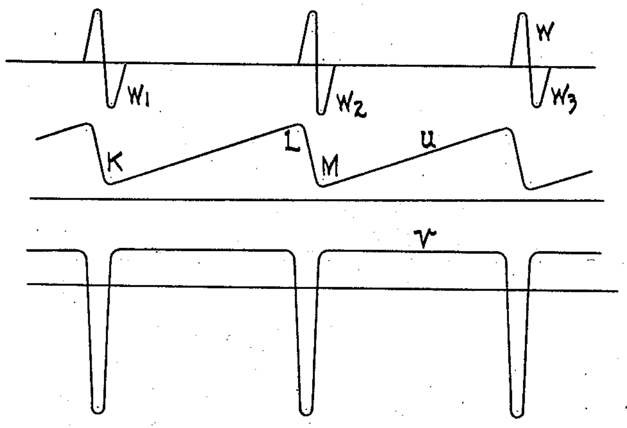
Figure 7:
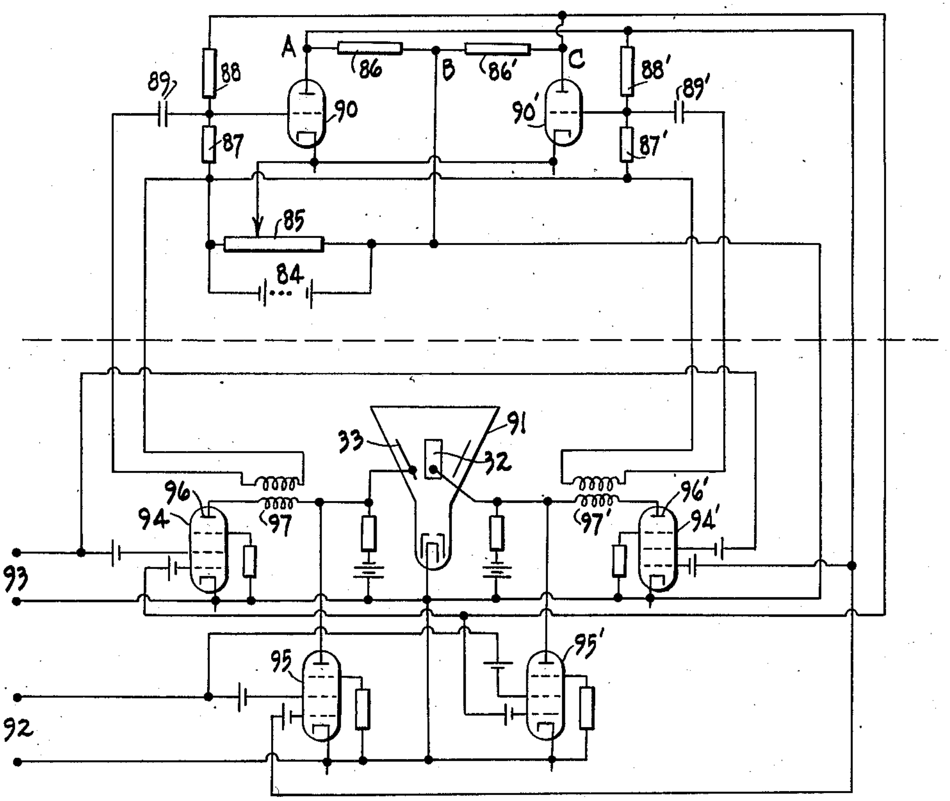

Figures 5, 6, 7 illustrate a method of scanning alternately in H and V directions.

Figure 1:
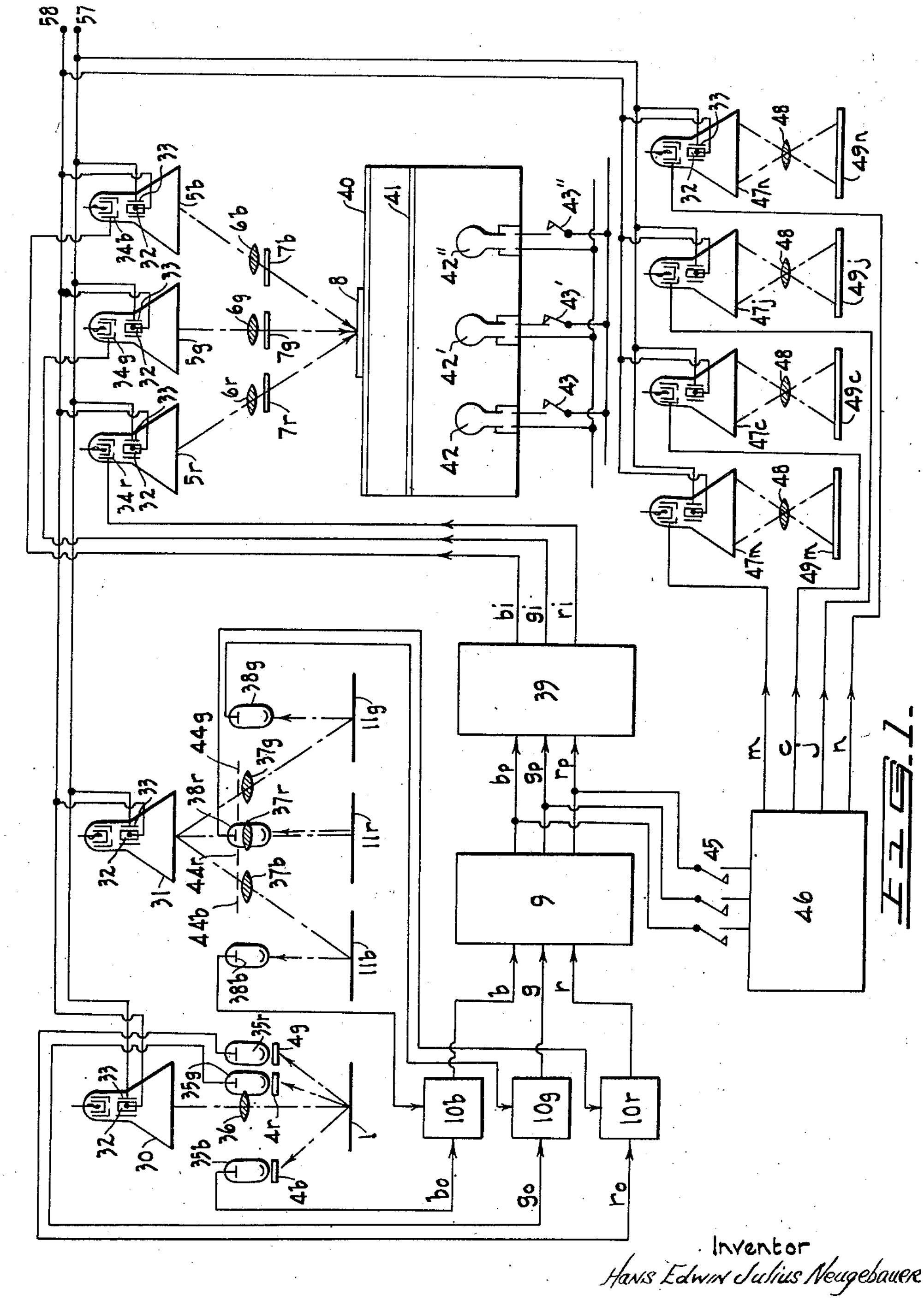
Figure 1 shows a color correction selector in accordance with the preferred embodiment of this invention.

In Figure 1 which shows a preferred embodiment of this invention. Original copy 1, which is assumed to be opaque, is scanned by means of C.-R. tube 30 and lens 36 which images onto picture 1, the luminous spot scanning the screen of tube 30. Three photo-multiplier tubes **35*b*, 35*g*, 35*r*, are arranged so that they pick up light reflected from the illuminated spot of picture 1. The spectral transmittance curves of filters 4*b*, 4*g*, 4*r*, which are interposed in front of tubes 35*b*, 35*g* and 35*r*** respectively are selected in such a way that the signals yielded by the photo-multiplier tubes are proportional to the color coordinates $b_o$, $g_o$, $r_o$, of the original picture.

The screen of another C.-R. tube 31 is imaged by three lenses, **37*b*, 37*g* and 37*r*, onto three plane plates 11*b*, 11*g*, 11*r*, for example sheets of grey paper, which are suitable for painting and drawing. Light reflected from 11*b* is picked up by photo-multiplier tube 38*b*, the signals yielded by this tube being used to alter the gain of the variable gain amplifier 10*b*. Similarly the signals yielded by photo-multiplier tubes 38*g* and 38*r* which pick up light reflected from 11*g* and 11*r* respectively, are used to alter the gains of variable gain amplifiers 10*g* and 10*r*** respectively.

Three C.-R. tubes **5*b*, 5*g*, 5*r*, are used to produce the image. The screens of these three tubes are projected by lenses 6*r*, 6*g*, 6*b*, respectively onto the same screen 8 so that the three pictures are in exact register. Red, green and blue filters 7*r*, 7*g*, 7*b* respectively are arranged close to the three lenses. It is advantageous if all five C.-R. tubes 30, 31, 5*b*, 5*g*, 5*r*, are of the same type. Their deviation plates 32 and 33** are connected to the same sweep voltages, so that synchronism can easily be attained.

As long as the plates **11*b*, 11*g*, 11*r* are plain the gains of amplifiers 10*b*, 10*g*, 10*r* are the same for the entire picture and signals $b$, $g$, $r$, supplied by these amplifiers, are in fixed proportions to the input signals $b_o$, $g_o$, $r_o$, yielded by the scanning device of the original copy. Signals $b$, $g$, $r$, are fed into computer 9** which simulates the color distortions which necessarily occur with the printing process for the reasons explained above. It is advantageous to use a computer of the memory type such as that described in copending application 420,434

Signals yielded by iconoscopes 54*b*, 54*g*, 54*r* serve to alter the gain of amplifiers 10*b*, 10*g*, 10*r* as explained for Fig. 1.

After correction sheets 11*b*, 11*g*, 11*r* have been painted in the manner described above so that the desired picture 8 is obtained, the operator disconnects the sweep voltages from the deviation plates by means of switches 59 and 60 and connects the plates to constant D. C. voltages which can be adjusted by means of potentiometers 61 and 62 so that on all iconoscopes and pictures tubes the beams are directed to one point of the picture where the colors are to be corrected, for example to a point of the woman's face 1*b* of Fig. 2. Then switches 56*b*, 56*g*, 56*r*, 56*b′*, 56*g′*, 56*r′*, are closed one after the other and the values of $b_0$, $g_0$, $r_0$ before correction and of $b$, $g$, $r$ after correction are read from instrument 55. These values serve to adjust a scanning machine such as that described in patent application 420,434.

Figure 4 shows a color correction selector based on the same principle of partial corrections that has been explained for scanning machines in application 425,567. Computing device 70 is controlled by signals $b_0$, $g_0$, $r_0$ and by a signal generated by means of a mask 66 which is shown in Figure 2*b*. The original copy 1 is projected by means of lenses 51*b*, 51*g*, 51*r* and color filters 52*b*, 52*g*, 52*r* on the light sensitive screens of three orthicons 69*b*, 69*g*, 69*r* yielding signals $b_0$, $g_0$, $r_0$. Semi-transparent mirrors 67 and 67′ act as a beam splitting device. Sweep voltages to produce the deviations of the electron beams, are supplied to deviation coils 64 and 65 via contacts 57 and 58. Signals $b_0$, $g_0$, $r_0$ are supplied by the last anodes of the multiplier sections of the orthicons. Details of the orthicons which are well known in the art need not be given. Also, power supplies, generators of sweep voltages and the like are so well known as not to require detailed description.

When the operator begins to inspect image 8 which is a reproduction of original 1, computing device 70 is adjusted in such a way that signals $b_n$, $g_n$, $r_n$ are supplied which are fed into computer 39. Computing device 70 comprises electronic switches and several computers. If the operator wants to introduce some color corrections restricted to certain areas of the picture, he disconnects the sweep voltages from the deviation coils by operating switches 59 and 60, and he adjusts, by means of potentiometers 61 and 62, the deviations so that the beams are directed to a point of the critical area, for instance to the woman's face of Fig. 2. Next, he operates switches 56*b*, 56*g*, 56*r* so that he can read from instruments 55*b*, 55*g*, 55*r* the values of $b_0$, $g_0$, $r_0$ representative for the color of the face. Then, he measures the color coordinates of the woman's arms and of the flowers.

Electronic switches forming part of computing device 70, are adjusted in the manner described in application 425,567 so that different computers are automatically switched on while face, arms or flowers are being scanned. Mask 66 is scanned by means of lens 51*m* and orthicon 69*m*. After mask 66 has been inserted and electronic switches and computers have been adjusted, switches 55, 59, 60 are brought back to their original position so that the operator can check whether or not image 8 is now satisfactory. If it is not satisfactory further corrections can be made.

Color correction selectors as shown in Fig. 3 and Fig. 4 can be used for opaque and transparent original copies. The device shown in Fig. 1 can be used for transparencies if photo-multiplier tubes 35 and color filters 4 are arranged under the original instead of over it.

Figures 5, 6, and 7 serve to illustrate a method of scanning alternately in horizontal and in vertical directions.

Fig. 5 is a front view of picture 80 which may be either original 1 or image 8 or one of the correction sheets 11 or one of the recorded pictures 49. The total area scanned is limited by square 81. Some of the scanning lines in vertical, 82, and horizontal, 83, directions are shown.

In Fig. 6 the saw-tooth scanning voltage for producing the frame scan which is applied to one pair of deviation plates of a C.-R. tube is represented by curve *u*. The section of the curve between points K and L represents the increasing deviation voltage. The total square 81 is scanned once during the time while the voltage raises from point K to L. The back trace between L and M can be used to control the change between line and frame scanning. Curves *v* and *w* will be explained below.

Methods of producing such saw-tooth voltages as shown by curve *u* are well known and need no special explanation.

The upper part of Fig. 7 over the dashed line represents one well known embodiment of the ordinary Eccles-Jordan-trigger circuit. Battery 84, potentimeter 85, resistors 86, 87, 88, 86′, 87′, 88′, condensors 89, 89′ and triodes 90, 90′ are connected in such a way that either triode 90 or triode 90′ is under current. In the first case point A is negative with respect to B which is on the same potential as C, in the latter case C is negative with respect to B which is on the same potential as A.

One of the C.-R. tubes shown in Figs. 1, 3 or 4 is represented by tube 91. Its deviation plates are 32 and 33. The sweep voltages for line scanning are applied to points 92, for frame scanning to points 93. Pentodes 94, 95, 94′, 95′ serve as switches in the following manner.

Let it be assumed that A and B are on the same potential. The first grids and cathodes of tubes 95 and 94′ are connected to A and B in such a way that these tubes are above cut-off, the first grids and cathodes of tubes 95′ and 94 are connected to B and C so that they are below cut-off. Therefore, the line sweep voltage is connected via tube 95 to the horizontal deviation plate 33, but it is cut off by tube 95′ from vertical deviation plate 32. At the same time the frame sweep voltage is connected via tube 94′ to vertical deviation plate 32, but it is cut off by tube 94 from horizontal deviation plate 33. The primary of transformer 97′ is connected between anode 96′ of tube 94′ and deviation plate 32. The secondary is connected to the grid of triode 90′.

Curve *v* of Fig. 6 shows the current in the primary, curve *w* the voltage induced in the secondary. Peek $W_2$ at the end of the back trace is used to trigger tube 90′ so that, during the following cycle of frame scanning, points B and C are on the same voltage and A is negative with respect to B. Consequently the frame sweep voltage is supplied to deviation plate 33, while the line sweep voltage is supplied to deviation plate 32. At the end of this cycle, a voltage peek $W_3$ is generated, by the back trace, in the secondary of transformer 97, whose primary is connected between anode 96 of tube 94 and deviation plate 33. The voltage peek is transmitted to the grid of triode 90 which is triggered so that the whole system is switched back to the state during the first cycle. (It is apparent that peeks $W_1$, $W_3$, . . . of curve *w* are generated in the secondary of transformer 96, peeks $W_2$, . . . are generated in the secondary of transformer 96′.)

The deviation plates of other C.-R. tubes, kinescopes and so on forming part of a color correction selector or scanning machine, are connected in parallel to those of tube 91. When tubes with magnetic instead of electrostatic deflection are used, modifications can readily be made as will be apparent to a person skilled in the art.

I claim:

1. A color correction selector for obtaining color corrections for use in making printed reproductions of colored pictures comprising means for scanning a picture and generating tristimulus signals representing the color coordinates of the picture, means controlled by said tristimulus signals for producing a projected image of the picture on a surface simulating the surface on which the reproduction is to be printed, means for adjusting the values of the signals supplied to said means for producing an image to impart color corrections to said image and filed April 1, 1954, so that it can easily be adjusted to suit different problems. Computer 9 yields signals $b_p$, $g_p$, $r_p$, which are proportioned to the color coordinates of the finally printed picture. Comuputer 39 transforms signals $b_p$, $g_p$, $r_p$ into signals $b_i$, $g_i$, $r_i$, by calculating the linear equations connecting these two triplets. Signals $b_i$, $g_i$, $r_i$ are supplied to the grids 34$b$, 34$g$, 34$r$ of C.-R. tubes 5$b$, 5$g$, 5$r$ respectively, so that the intensities of these tubes are in proportion to signals $b_i$, $g_i$, $r_i$. It is apparent that the non-linear relation between spot intensity and grid voltage is anticipated by computer 39 so that, strictly speaking, the signals supplied from computer 39 to grids 34$b$, 34$g$, 34$r$ are certain non-linear functions of $b_i$, $g_i$, $r_i$, whose shape is defined by the inverse of the intensity-against-grid voltage curves of the C.-R. tubes.

Screen 8, preferably, is one or several sheets of plain printing paper not much wider than the image. The paper used for screen 8 should simulate the printing paper used for the final reproduction. Several sheets are used to prevent light radiated from the lamps 42, 42′, 42″, from shining through. These lamps illuminate a transparent plate 40, for example of ground glass, on which paper 8 is placed. A second plate 41 for diffuse scattering of light is inserted between lamps and plate 40. A number of lamps 42, 42′, 42″ are provided. As many lamps are switched on by means of switches 43, 43′, 43″ as are necessary to imitate the typical brightness of the surroundings in which the printed picture will finally be observed.

If the operator wishes to make overall changes to the general hue of the reproduced picture he opens or closes the apertures of one or more of stops 44$b$, 44$g$, 44$r$ connected with lenses 37$b$, 37$g$, 37$r$. If he wishes to change a certain section of the picture he paints with dark or bright crayons on screens 11$b$, 11$g$, 11$r$. Under the assumption that he wants to increase blue in a certain section of the picture, he covers the corresponding section of the grey paper 11$b$ with a bright crayon or white chalk so that more light is reflected from this area and therefore the gain of amplifier 10$b$ is increased during the time interval when this section is being scanned. At the same time he can reduce the amount of red and green from the same section of the picture by covering the corresponding sections of papers 11$r$ and 11$g$ with dark crayon, carbon or pencil. It is apparent that any desired correction can easily be put into effect. There is no difficulty in selecting the correct positions on sheets 11$b$, 11$r$, 11$g$ as an image of the tip of the marking pencil will be seen on image 8 when the pencil is introduced between, for example, sheet 11$b$ and the scanning device. Sheets 11 and 8 should be located so that the operator can watch sheet 8 while he is drawing on sheets 11$b$, 11$r$ and 11$g$.

When the appearance of the image on plate 8 is satisfactory the settings of apertures 44$b$, 44$g$, 44$r$ are registered and are used together with the sheets 11$b$, 11$g$, 11$r$ to adjust the scanning machine used for making corrected printing plates.

It is advantageous to use a scanning machine as described in patent application 420,434, filed April 1, 1954, in which the computing device consists of two stages: Stage one is designed to convert input signals $b_o$, $g_o$, $r_o$ to output signals $b_p$, $g_p$, $r_p$. This stage can be identical to the corresponding setup of the color correction selector yielding signals $b_p$, $g_p$, $r_p$. These signals are fed into the second stage of the computer of the scanning machine which yields signals $m$, $j$, $c$, $n$, such that the color coordinates of the printed picture are proportional to $b_p$, $g_p$, $r_p$.

The scanning machine may be a separate unit distinct from the color correction selector and signals $b_p$, $g_p$, $r_p$, may be generated by a computer unit different from the corresponding unit of the color correction selector. However, scanning machine and color correction selector may also be built together as a single unit as shown in Fig. 1.

When image 8 is considered satisfactory triple switch 45 is closed and signals $b_p$, $g_p$, $r_p$ fed into computer 46 which preferably is of the type described in patent application 420,434. If desired an additional switch can be provided or switch 46 can be designed to disconnect signals $b_p$, $g_p$, $r_p$ from computer 39. Computer 46 generates signals $m$, $c$, $j$, $n$ which are used to control the intensities of C.-R. tubes 47$m$, 47$c$, 47$j$, 47$n$. The deviation plates 32 and 33 of these tubes are connected to the same sweep voltages as the plates of tubes 30 and 31. The screens of tubes 47 are imaged by lenses 48 onto four photo-graphic layers 49$m$, 49$c$, 49$j$, 49$n$ which, after development, provide corrected color separations which are used to make printing plates for the magenta, cyan, yellow and neutral inks respectively. The pictures printed with these printing plates exhibit the same colors as image 8.

It is apparent that scanning must be faster with the color correction selector than with an ordinary scanning machine used for making printing plates lest flicker of the image becomes disturbing. The screens of tubes 5$r$, 5$g$, 5$b$ are covered with fluorescent material of long after glow. Even so it is necessary to scan the entire picture at a speed of the order of once per second or faster. Therefore, computers 9 and 39 must have very short delay times. This generally is no problem as concerns computer 39 which calculates only simple linear expressions. It is advantageous therefore to use computers of the memory type described in patent application 420,434 the delay time of which is very short.

In addition, if the color correction selector and scanning machine are different units, the raster of the color correction selector may be coarser than that of the scanning machine as image 8 is used only to select the colors and not to check the definition of the picture.

If original copy 1 is shown for instance by Fig. 2 and if the face 1$b$ of the woman is slightly too red, the arms 1$a$ are even more excessively red and the flowers 1$c$ are much too red, the correction sheet 11$r$, after image 8 has been corrected, will have the appearance shown in Fig. 2$a$.

The opacities measured on this sheet indicate the amounts of red correction desired for the corresponding picture areas representing face, arms and flowers.

When corrected separations 49 are recorded by means of tubes 47 it is advantageous to work at the same high scanning speed necessary for freeing picture 8 from flicker. This speed should be high enough and the intensity of tubes 47 low enough so that the picture must be scanned several times in order to produce a sufficient exposure of photographic layers 49. A repeated recording on the same photographic material has the advantages that slight shifts of D. C.-amplifiers which may be part of the computing device are made harmless because the photographic layers average over a longer period, and that the line structure due to the scanning process is less visible. The avoidance of line structure can be increased by alternately scanning along horizontal and vertical lines. This also holds true for image 8.

A different arrangement of color correction selector is shown in Fig. 3 in which the color correction selector is a separate unit from the scanning machine. Lenses 51$b$, 51$g$, 51$r$ project images of original copy 1 onto the light sensitive screens of three iconoscopes 50$b$, 50$g$, 50$r$. The light passes through a blue, a green, and a red filter 52$b$, 52$g$, 52$r$, respectively so that the signals generated by the iconoscopes are proportional to $b_o$, $g_o$, $r_o$.

Each of the three correction sheets 11$b$, 11$g$, 11$r$ is imaged by a lens 53$b$, 53$g$, 53$r$, respectively onto the light sensitive screen of three iconoscopes 54$b$, 54$g$, 54$r$. Image 8 is produced the same way as shown on Fig. 1. The deviation plates of iconoscopes 50$b$, 50$g$, 50$r$, 53$b$, 53$g$, 53$r$ and of picture tubes 5$b$, 5$g$, 5$r$, are connected to the same sweep voltages applied to connections 57 and 58.

means for generating signals having values controlled by said adjustments, the last mentioned signals being adapted to be used to give color corrections for the final printed reproduction similar to said color corrections to the image.

2. A color correction selector for obtaining color corrections for use in making printed reproductions of colored pictures comprising means for scanning a picture and generating tristimulus signals representing the color coordinates of the picture, means for generating correction signals representing corrections to be imparted to said tristimulus signals, means for generating a triplet of signals representing said tristimulus signals modified by said correction signals, means for producing a projected image of the picture on a surface simulating the surface on which the reproduction is to be printed, said means for producing an image being controlled by the triplet of modified signals to impart color corrections to the image, and means for using one set of signals selected from said correction signals and modified signals to provide color corrections for the final printed reproduction similar to said color corrections to the image.

3. A color correction selector for obtaining color corrections for use in making printed reproductions of colored pictures comprising means for scanning a picture and generating tristimulus signals representing the color coordinates of the picture, means for generating correction signals representing corrections to be imparted to said tristimulus signals, means for generating a triplet of signals representing said tristimulus signals modified by said correction signals, computing means for providing tristimulus signals representing corrected printing colors from said triplet of signals, means for projecting an image of the picture on a surface simulating the surface on which the reproduction is to be printed, computing means for providing signals suitable for controlling the means for projecting an image, the signals representing the corrected printing colors being supplied as the input to the last mentioned computing means, and means for switching the signals representing the corrected printing colors to the input of a computer adapted to produce signals to control means for making printed reproductions.

4. A color correction selector for obtaining color corrections for use in making printed reproductions of colored pictures comprising means for scanning a picture and generating tristimulus signals representing the color coordinates of the picture, means for generating correction signals representing corrections to be imparted to said tristimulus signals, amplifiers for said tristimulus signals, said correction signals being applied to change the gain of said amplifiers to provide amplifier output signals representing said tristimulus signals modified by said correction signals, computing means for providing tristimulus signals representing corrected printing colors from said modified tristimulus signals, means for projecting an image of the picture on a surface simulating the surface on which the reproduction is to be printed, computing means for providing signals suitable for controlling the means for projecting an image, the signals representing the corrected printing colors being supplied as the input to the last mentioned computing means, and means for switching the signals representing the corrected printing colors to the input of a computer adapted to produce signals to control means for making printed reproductions.

5. A color correction selector for obtaining color corrections for use in making printed reproductions of colored pictures comprising means for scanning a picture and generating tristimulus signals representing the color coordinates of the picture, means for generating separate correction signals for each of the spectral components of the original, said correction signals representing corrections to be imparted to said tristimulus signals, the last mentioned means being adapted to generate correction signals during the total scanning period or while predetermined portions of the picture are being scanned, means for generating a triplet of signals representing said tristimulus signals modified by said correction signals, computing means for providing tristimulus signals representing corrected printing colors from said modified tristimulus signals, means for projecting an image of the picture on a surface simulating the surface on which the reproduction is to be printed, computing means for providing signals suitable for controlling the means for projecting an image, the signals representing the corrected printing colors being supplied as the input to the last mentioned computing means, and means for switching the signals representing the corrected printing colors to the input of a computer adapted to produce signals to control means for making printed reproductions.

6. A color correction selector as in claim 5 in which the means for generating separate correction signals for each of the spectral components of the picture comprises means for scanning three neutral surfaces and receiving signals from said surfaces for modifying the respective tristimulus signals from the original, said surfaces being adapted to be marked to provide localized corrections and means for individually changing the correction signals to provide overall corrections.

7. A color correction selector as in claim 6 in which the neutral surfaces are disposed adjacent to the surface simulating the surface on which the reproduction is to be printed.

8. A color correction selector as in claim 6 in which the means for scanning the neutral surfaces includes means for scanning said surfaces synchronously with the scanning of the picture.

9. An apparatus for scanning and reproducing pictures comprising a multiple scanning device yielding electric signals which are representative of the colors of an original multicolored picture, a reproducing device for providing a projected image of the original picture, a computing device in operational connection to said scanning and reproducing devices, said computing device comprising two stages, the first stage of the computer being controlled by signals yielded by said scanning device and generating signals representative of the colors of a reproduction of said original, the second stage of the computer being controlled by the signals generated by said first stage of the computer and generating signals which control said reproducing device, said reproducing device comprising a plurality of separate means for reproducing a partial image of said original, said separate means each being controlled by a signal from the second stage of the computer, said partial images being combined by said reproducing device to provide a reproduction of the original having colors characterized by the signals generated by the first stage of the computer.

10. An apparatus for scanning and reproducing pictures comprising a multiple scanning device yielding electric signals which are representative of the colors of an original multicolored picture, a reproducing device for providing a projected image of the original picture, a computing device in operational connection to said scanning and reproducing devices, said computing device comprising two stages the first stage of the computer being controlled by signals yielded by said scanning device and generating signals representative of the colors of a reproduction of said original, the second stage of the computer being controlled by the signals generated by said first stage of the computer and generating signals which control said reproducing device, said reproducing device comprising a plurality of separate means for reproducing a partial image of said original, said separate means each being controlled by a signal from the second stage of the computer, said partial images being combined by said reproducing device to provide a reproduction of the original having colors characterized by the signals generated by the first stage of the computer and additional scanning means for generating signals for changing, for predetermined sections of the original picture, the functional relationship between the signals yielded by said multiple scanning device and the signals generated by the first stage of the computer.

11. An apparatus for scanning and reproducing pictures comprising a multiple scanning device yielding electric signals which are representative of the colors of an original multicolored picture, a reproducing device for providing a projected image of the original picture, a computing device in operational connection to said scanning and reproducing devices, said computing device comprising two stages, the first stage of the computer being controlled by signals yielded by said scanning device and generating signals representative of the colors of a reproduction of said original, the second stage of the computer being controlled by the signals generated by said first stage of the computer and generating signals which control said reproducing device, said reproducing device comprising a plurality of separate means for reproducing a partial image of said original, said separate means each being controlled by a signal from the second stage of the computer, said partial images being combined by said reproducing device to provide a reproduction of the original having colors characterized by the signals generated by the first stage of the computer and additional scanning means for generating signals for changing for predetermined sections of the original picture, the functional relationship between the signals yielded by said multiple scanning device and the signals generated by the first stage of the computer and means for using said signals generated by the first stage of the computer to impart corrections to means for making a printed reproduction of said original.

12. In a color correction selector for use in making printed reproductions of colored originals, means for scanning an original to provide tristimulus signals representing the color coordinates of the original, means for generating correction signals representing corrections to be imparted to said tristimulus signals, means for generating a triplet of signals representing said tristimulus signals modified by said correction signals, and means for producing a projected image of the original on a surface simulating the surface on which the reproduction is to be printed, said means for producing an image being controlled by the triplet of modified signals.

13. In a color correction selector for use in making printed reproductions of colored originals, means for scanning an original to provide tristimulus signals representing the color coordinates of the original, means for generating correction signals representing corrections to be imparted to said tristimulus signals, means for generating a triplet of signals representing said tristimulus signals modified by said correction signals, computing means for providing signals representing the colors to be printed corresponding to said modified tristimulus signals, means for projecting an image of the original on a surface simulating the surface in which the reproduction is to be printed, computing means for providing signals suitable for controlling the means for projecting an image, the signals representing the colors to be printed being supplied as the input to the last mentioned computing means.

14. In a color correction selector for use in making printed reproductions of colored originals, means for scanning an original to provide tristimulus signals representing the color coordinates of the original, means for generating correction signals representing corrections to be imparted to said tristimulus signals, amplifiers for said tristimulus signals, said correction signals being applied to change the gain of said amplifiers to provide amplifier output signals representing said tristimulus signals modified by said correction signals, means for projecting an image of the original on a surface simulating the surface on which the reproduction is to be printed, computing means for providing signals suitable for controlling the means for projecting an image, said modified tristimulus signals being supplied as the input to the last mentioned computing means.

15. In a color correction selector for use in making printed reproductions of colored originals, means for scanning an original to provide tristimulus signals representing the color coordinates of the original, means for generating separate correction signals for each of the spectral components of the original, said last mentioned means being adapted to generate correction signals during the total scanning period or while predetermined portions of the original are being scanned, means for generating a triplet of signals representing said tristimulus signals modified by said correction signals, means for projecting an image of the original on a surface simulating the surface on which the reproduction is to be printed, computing means for providing signals suitable for controlling the means for projecting an image, said modified tristimulus signals being supplied as the input to the last mentioned computing means.

References Cited in the file of this patent

UNITED STATES PATENTS

| | | |
|---|---|---|
| 2,278,940 | Murphy | Apr. 7, 1942 |
| 2,434,561 | Hardy | Jan. 13, 1948 |